United States Patent
Abe et al.

(10) Patent No.: US 11,752,944 B2
(45) Date of Patent: Sep. 12, 2023

(54) VEHICLE CARGO COMPARTMENT STRUCTURE

(71) Applicants: TOYOTA BOSHOKU KABUSHIKI KAISHA, Aichi-ken (JP); TOYOTA JIDOSHA KABUSHIKI KAISHA, Aichi-ken (JP); SUBARU CORPORATION, Tokyo-to (JP)

(72) Inventors: Shinya Abe, Nisshin (JP); Shigeki Sumiya, Chiryu (JP); Yoshiki Funahashi, Komaki (JP)

(73) Assignees: TOYOTA BOSHOKU KABUSHIKI KAISHA, Aichi-Ken (JP); TOYOTA JIDOSHA KABUSHIKI KAISHA, Aichi-Ken (JP); SUBARU CORPORATION, Toyoto-To (JP)

( * ) Notice: Subject to any disclaimer, the term of this patent is extended or adjusted under 35 U.S.C. 154(b) by 0 days.

(21) Appl. No.: 17/675,164

(22) Filed: Feb. 18, 2022

(65) Prior Publication Data
US 2022/0324389 A1    Oct. 13, 2022

(30) Foreign Application Priority Data
Apr. 7, 2021 (JP) .................................. 2021-065102

(51) Int. Cl.
*B60R 5/04* (2006.01)
(52) U.S. Cl.
CPC .................................. *B60R 5/044* (2013.01)
(58) Field of Classification Search
CPC ... B60R 5/044; B60R 5/047; B60R 2013/015; B60R 2013/018; B60R 13/013; B60R 13/011

USPC ....... 296/37.1, 37.16, 136.03, 136.04, 24.43, 296/24.33
See application file for complete search history.

(56) References Cited

U.S. PATENT DOCUMENTS

| 5,632,520 A * | 5/1997 | Butz | B60R 5/047 |
| | | | 296/37.16 |
| 9,738,226 B2 * | 8/2017 | Kamada | B60R 5/047 |
| 9,902,330 B2 * | 2/2018 | Fujii | B60R 5/047 |

(Continued)

FOREIGN PATENT DOCUMENTS

| JP | 5235218 | 7/2013 |
| JP | 2020-168994 | 10/2020 |

*Primary Examiner* — Joseph D. Pape
*Assistant Examiner* — Veronica M Shull
(74) *Attorney, Agent, or Firm* — Greenblum & Bernstein, P.L.C.

(57) ABSTRACT

A vehicle cargo compartment structure includes a first side trim and a second side trim that include a first projecting portion and a second projecting portion receiving a cargo floor board thereon. The first side trim further includes a first upper support portion above the first projecting portion and a first lower support portion under the first projecting portion. The first upper support portion supports a first end of a cargo cover assembly in a first state and includes a first upper opposite surface that is opposite the first end in the first state. The first lower support portion supports the first end in a second state and includes a first lower opposite surface that is opposite the first end in the second state. The first lower opposite surface is more to a vehicular exterior side in the vehicular width direction compared to the first upper opposite surface.

18 Claims, 13 Drawing Sheets

(56) References Cited

U.S. PATENT DOCUMENTS

| | | | |
|---|---|---|---|
| 2011/0266828 A1* | 11/2011 | Kikuchi | B60R 5/04 296/136.04 |
| 2016/0023610 A1* | 1/2016 | Valencia Cruz | B60R 5/045 296/37.16 |
| 2020/0156550 A1* | 5/2020 | Park | B62D 25/087 |

* cited by examiner

VEHICLE CARGO COMPARTMENT STRUCTURE

CROSS REFERENCE TO RELATED APPLICATION

This application claims priority from Japanese Patent Application No. 2021-65102 filed on Apr. 7, 2021. The entire contents of the priority application are incorporated herein by reference.

TECHNICAL FIELD

The technology described herein relates to a vehicle cargo compartment structure.

BACKGROUND

A cargo cover assembly is installed in a vehicle cargo compartment with two cover attachments. The cover attachments are attached to rear side trims of a vehicle. The cargo cover assembly has a configuration similar to a spring-operated roller shade. A floor of the vehicle cargo compartment is defined by a right cargo floor board, a left cargo floor board, and a middle cargo floor board. The right cargo floor board and the left cargo floor board include lid portions that can be open and closed with hinges. The cargo cover assembly may be removed from the cover attachments and stored in an underfloor storage of the vehicle. The underfloor storage includes a cover storing recess covered with the right cargo floor board, the left cargo floor board, and the middle cargo floor board. To store the cargo cover assembly in the cover storing recess, the middle cargo floor board is lifted to an open position and the right cargo floor board and the left cargo floor board are pivoted on the hinges so that the cover storing recess is uncovered and the cargo cover assembly is placed in the cover storing recess. After the cargo cover assembly is placed in the cover storing recess, the right cargo floor board, the left cargo floor board, and the middle cargo floor board are returned to their original positions.

As described above, several steps are required to store the cargo cover assembly in the underfloor storage. Further, a border between the right cargo floor board and the middle cargo floor board and a border between the left cargo floor board and the middle cargo floor board spoil a sophisticated appearance. If a tool storing space is located adjacent to the cover storing recess, the placement or the removal of the cargo cover assembly may require more steps so that the cargo cover assembly is not placed in the tool storing space.

SUMMARY

The technology described herein was made in view of the foregoing circumstances. An object is to provide a vehicle cargo compartment structure that allows a user to easily place a cargo cover assembly in a storage space and easily remove the cargo cover assembly from the storage space. Another object is to improve appearance of the vehicle cargo compartment structure.

The present disclosure is related to a vehicle cargo compartment structure that includes a first side trim and a second side trim disposed opposite the first side trim in the vehicular width direction and having a cargo space between the first side trim and the second side trim. The first side trim includes a first body section and a first projecting portion projecting from the first body section toward a vehicular interior side in a vehicular width direction. The second side trim includes a second body section and a second projecting portion projecting from the second body section toward the vehicular interior side in the vehicular width direction. The second projecting portion and the first projecting portion receive a cargo floor board thereon. The first side trim further includes a first upper support portion above the first projecting portion and a first lower support portion under the first projecting portion. The first upper support portion supports a first end of a cargo cover assembly in a first state and includes a first upper opposite surface that is opposite the first end in the first state. The first lower support portion supports the first end in a second state and includes a first lower opposite surface that is opposite the first end in the second state. The first lower opposite surface is more to a vehicular exterior side in the vehicular width direction compared to the first upper opposite surface.

DETAILED DESCRIPTION

Figure 1:
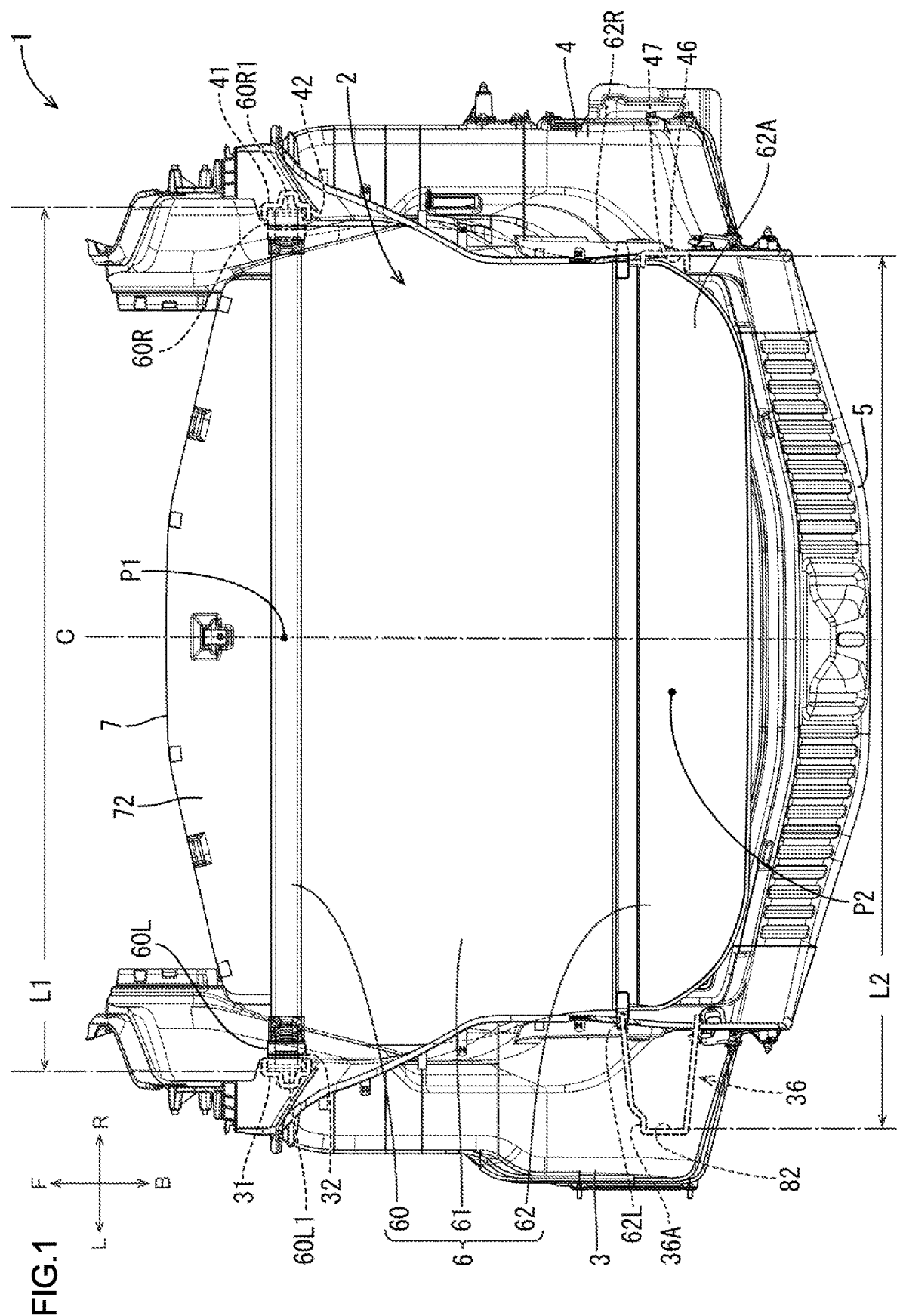
FIG. 1 is a top view of a vehicle cargo compartment structure including a cargo floor board and a cargo cover that covers a cargo space of a vehicle.

An embodiment will be described in detail with reference to FIGS. 1 to 13. A vehicle cargo compartment structure 1 of a vehicle (an automobile) defines a cargo space 2 at a rear of the vehicle. Arrows F, B, U, D, L, and R in the drawings points a front side, a rear side, an upper side, a lower side, a left side, and a right side, respectively. A right-left direction may be referred to as a vehicle width direction.

Figure 2:
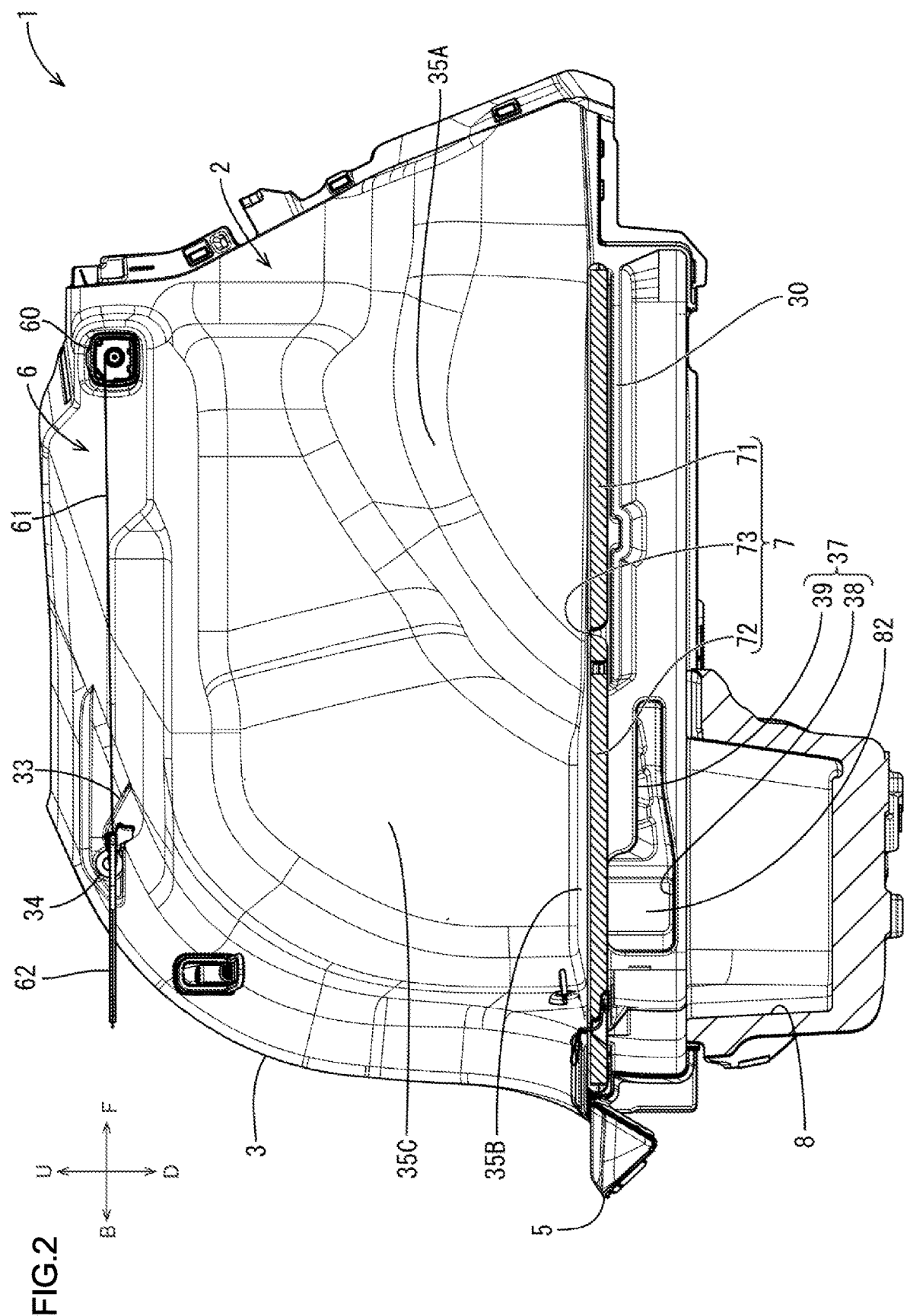
FIG. 2 is a cross-sectional view of the cargo compartment structure of the vehicle along a center line C in FIG. 1.

As illustrated in FIGS. 1 and 2, the vehicle cargo compartment structure 1 includes a left trim 3 (a left sidewall, a first side trim), a right trim 4 (a right sidewall, a second side trim), a rear trim 5, a cargo cover assembly 6, and a cargo floor board 7. The cargo space 2 is defined by the left trim 3, the right trim 4, the cargo cover assembly 6, and the cargo floor board 7. The cargo space 2 is between the left trim 3 and the right trim 4. The rear trim 5 extends in the vehicle width direction. The rear trim 5 is attached to rear ends of the left trim 3 and the right trim 4.

The cargo cover assembly 6 includes a cassette 60, a cargo cover 61, a flap 62, a left protrusion 62L, and a right protrusion 62R. The cassette 60 extends in the vehicle width direction. The cargo cover 61 is rolled up and housed in the cassette 60. The flap 62 has higher rigidity than that of the cargo cover 61 and has an elongated semielliptical shape. The flap 62 is coupled to a rear end of the cargo cover 61. The left protrusion 62L and the right protrusion 62R protrude from a left edge and a right edge of the flap 62, respectively.

The cassette 60 includes a left end 60L and a right end 60R that house spring mechanisms, respectively. The left end 60L and a right end 60R move in the vehicle width direction, that is, the cassette 60 shrinks and expands in the vehicle width direction. When the left end 60L and the right end 60R move inward and the cassette 60 shrinks in the vehicle width direction, outward forces in the vehicle width direction are created by the spring mechanisms in the left end 60L and the right end 60R. This creates a snag fit of the cassette 60 and thus the cassette 60 stays at a predefined position.

A user can hold and pull the flap 62 to pull the cargo cover 61 out of the cassette 60 over the cargo space 2 and insert the protrusions 62L, 62R in a left recess 34 of the left trim 3 and a right recess 44 of the right trim 4, respectively. With the protrusions 62L, 62R in the left recess 34 of the left trim 3 and the right recess 44 of the right trim 4, respectively, the cargo cover 61 remains taut and the cargo space 2 is covered with the cargo cover 61.

Figure 3:
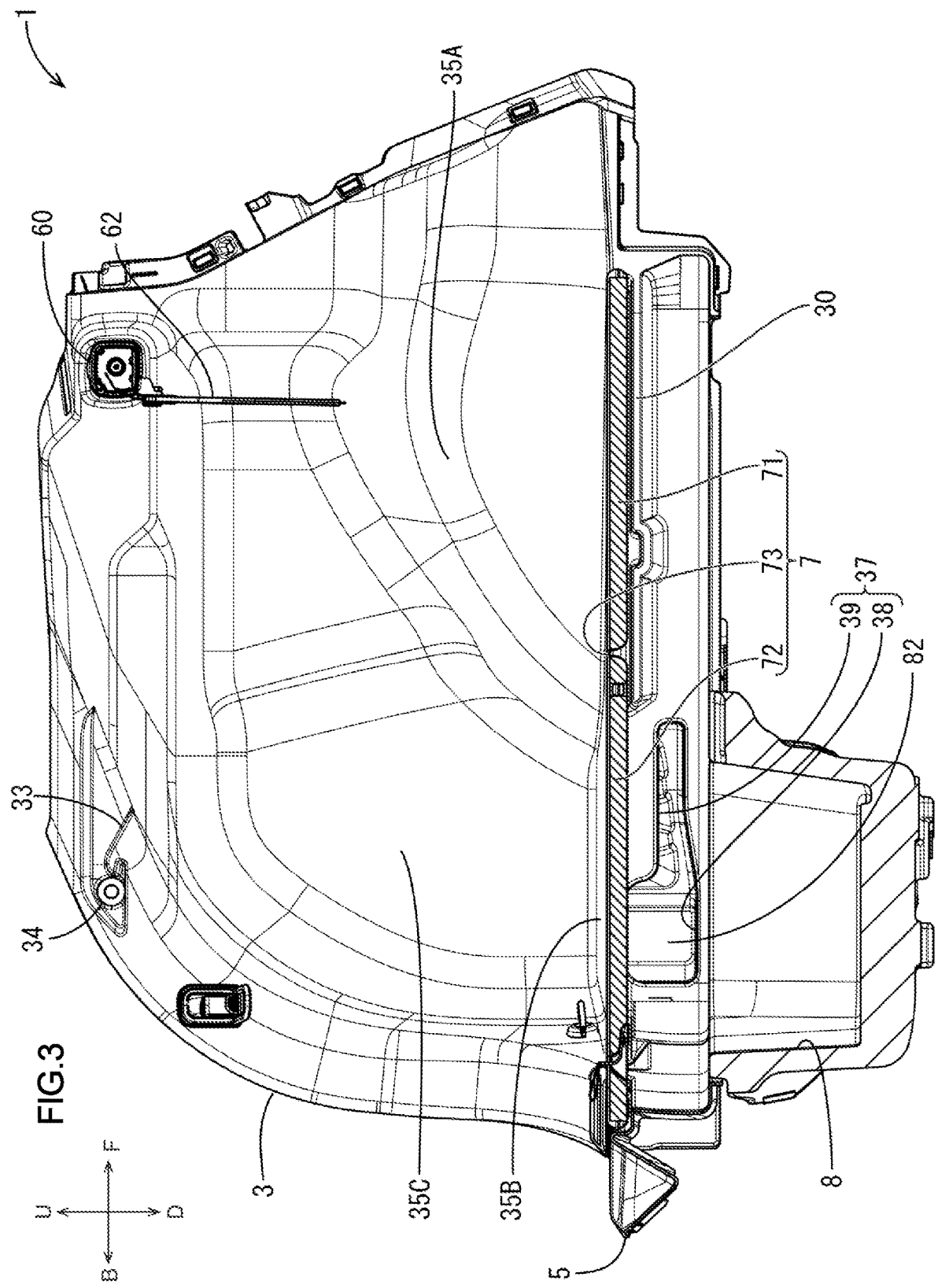
FIG. 3 is a cross-sectional view of the cargo compartment structure with the cargo cover that is retracted.
Figure 4:
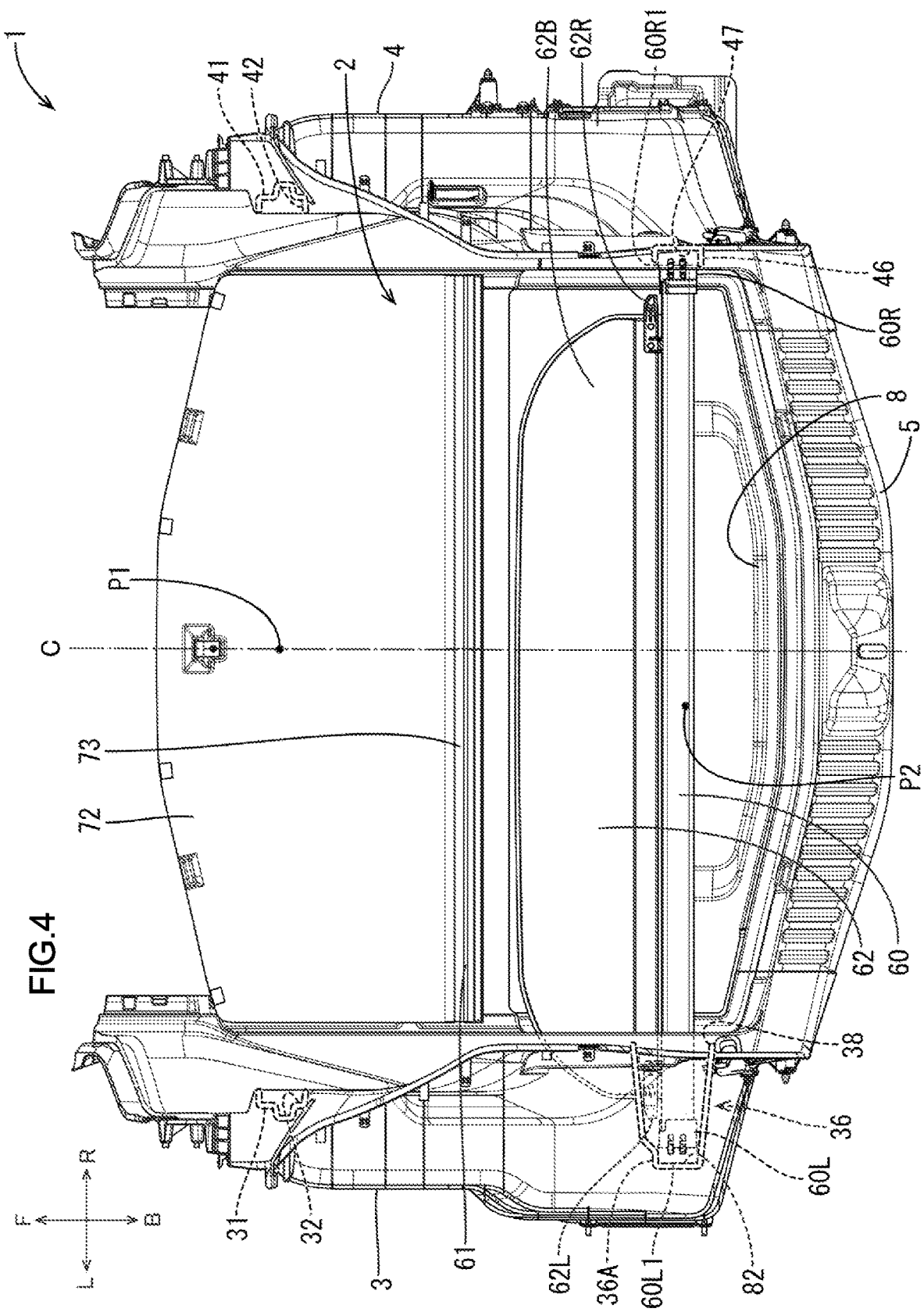
FIG. 4 is a top view of the cargo compartment structure with the cargo cover assembly that is stored in a space and the cargo floor board that is folded.
Figure 5:
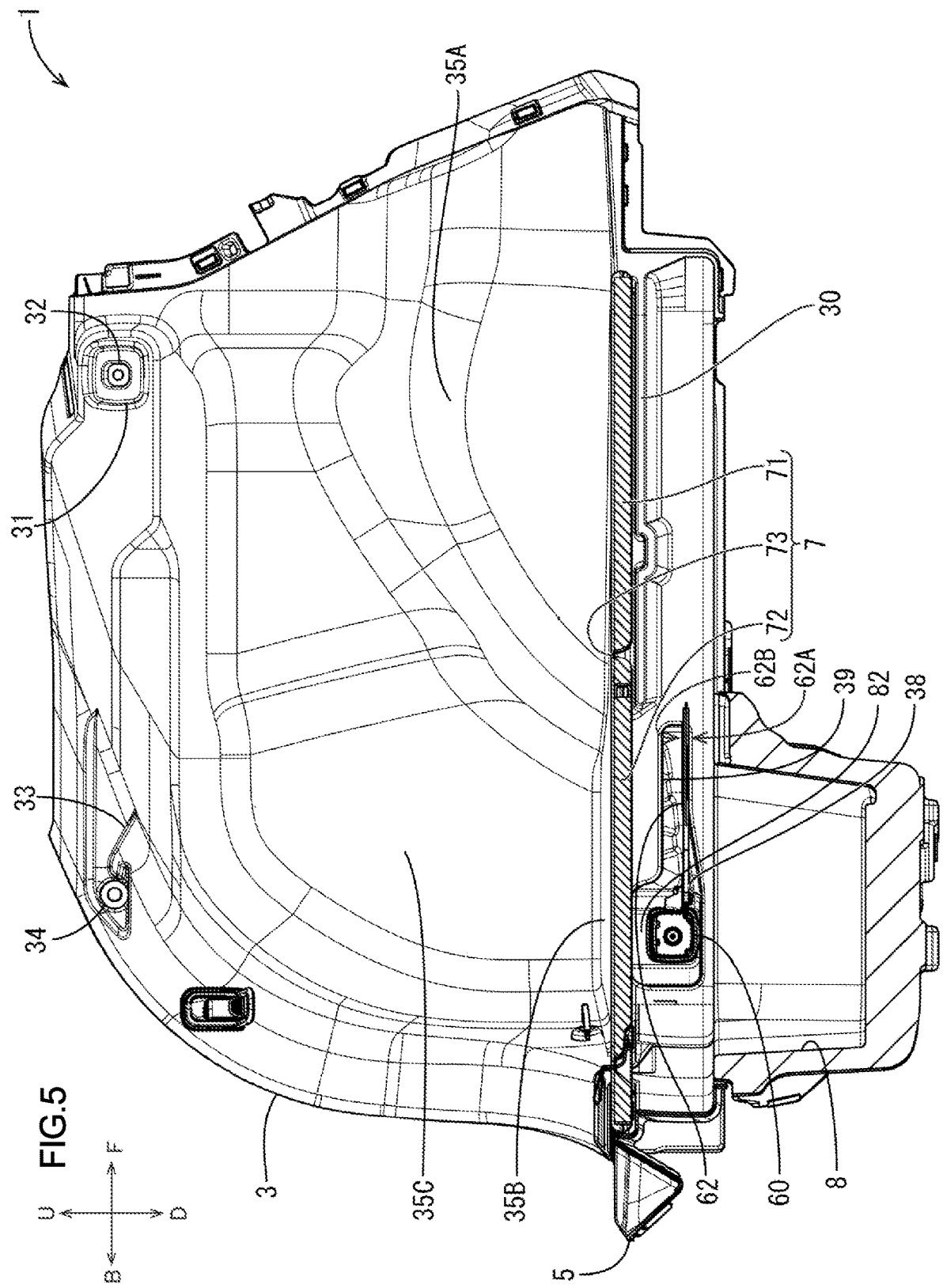
FIG. 5 is a cross-sectional view of the cargo compartment structure with the cargo cover assembly that is stored in the space and the cargo floor board that is unfolded.

When the cargo cover assembly 6 is in use, the cargo cover assembly 6 is disposed over the cargo floor board 7 as illustrated in FIGS. 1 to 3. When the cargo cover assembly 6 is not in use, the cargo cover assembly 6 is stored under the cargo floor board 7 as illustrated in FIGS. 4 and 5. When the cargo cover assembly 6 is in use, the cargo cover 61 may be pulled out of the cassette 60 to cover the cargo space 2 (see FIGS. 1 and 2) or rolled up and retracted in the cassette 60 with the flap 62 hanging from the cassette 60 (see FIG. 3).

When the cargo cover assembly 6 is in use (an in-use state, a first state) as illustrated in FIG. 1, the cargo cover assembly 6 is disposed such that the cassette 60 is on a front side and the flap 62 is on a rear side. As illustrated in FIG. 1, a front surface 62A of the flap 62 faces upward. When the cargo cover assembly 6 is not in use (a not-in-use state, a second state) as illustrated in FIG. 4, the flap 62 is disposed in front of the cassette 60 and a back surface 62B of the flap 62 faces upward. Thus, the cargo cover assembly 6 is turned up side down when the cargo cover assembly 6 is moved to a not-in-use state from a use state and vice versa.

As illustrated in FIG. 2, the cargo floor board 7 includes a first board portion 71, a second board portion 72, and a hinge portion 73. The first board portion 71 is disposed at a front of the vehicle cargo compartment structure 1. The second board portion 72 is coupled to a rear end of the first board portion 71 by the hinge portion 73. The cargo floor board 7 is foldable on the hinge portion 73 so that the second board portion 72 is placed on the first board portion 71. In FIGS. 2, 3 and 5, the cargo floor board 7 that is unfolded and set in a horizontal position is illustrated. In FIGS. 1 and 4, the cargo floor board 7 that is folded is illustrated. When the cargo floor board 7 is unfolded, a first storage 8 that opens upward is covered with the second board portion 72.

Figure 6:
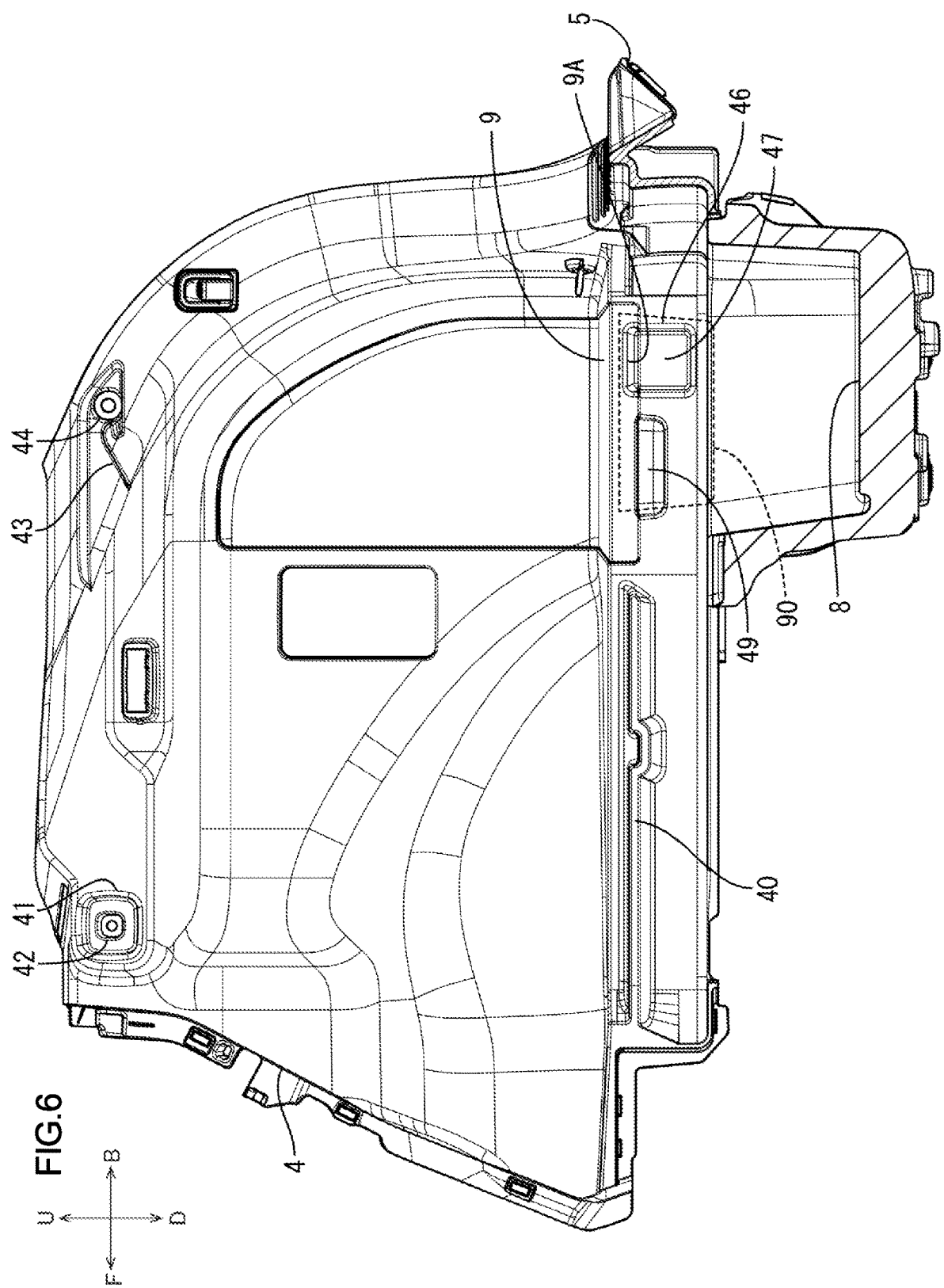
FIG. 6 is a left side view of a right trim.
Figure 7:
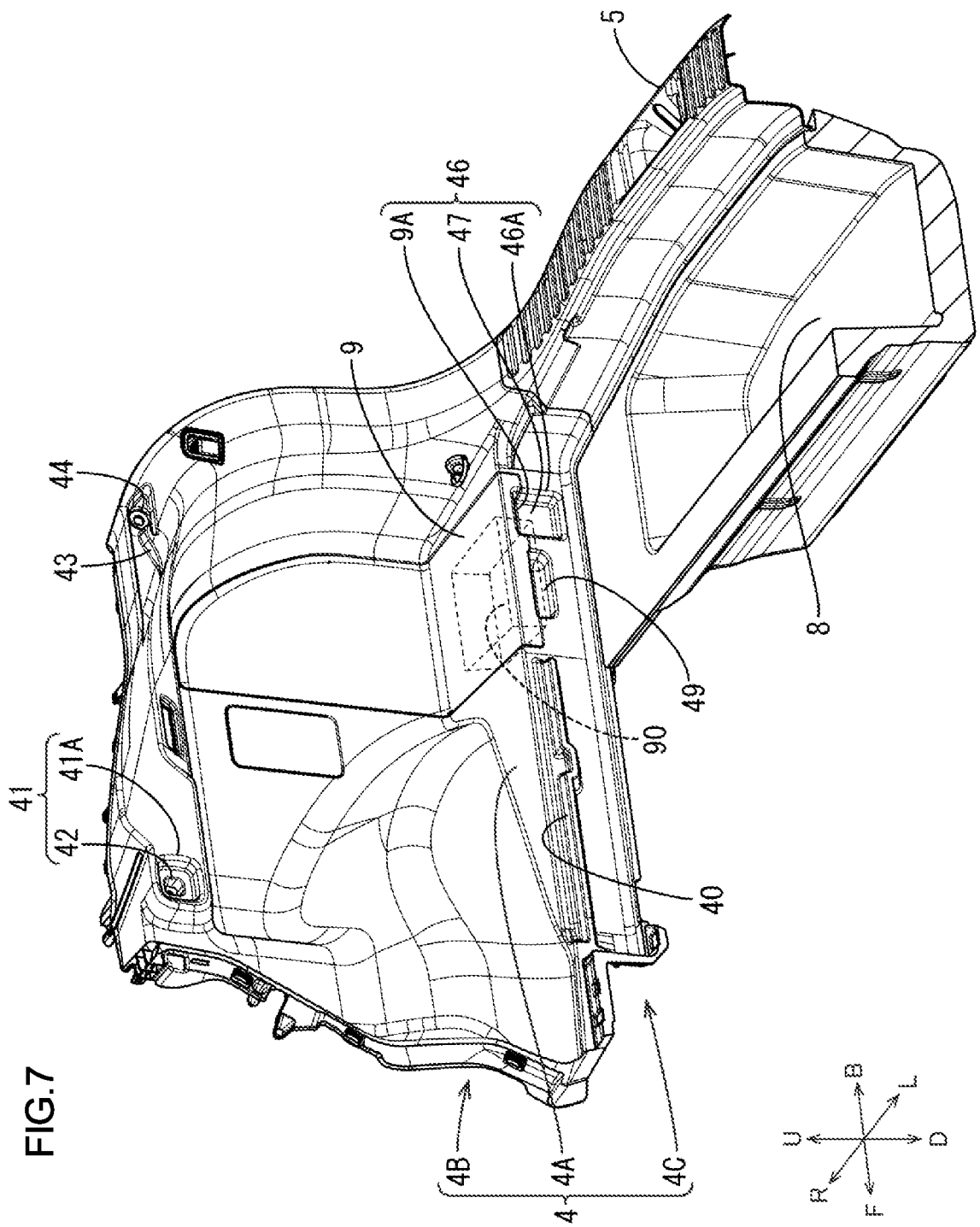
FIG. 7 is a perspective view of the right trim viewed from an upper front point.

As illustrated in FIGS. 6 and 7, the right trim 4 includes a horizontal portion 4A, an upper vertical portion 4B, and a lower vertical portion 4C. The horizontal portion 4A (a second body section) is disposed in a horizontal position and includes a rear section that is coupled to the rear trim 5. The upper vertical portion 4B (the second body section) extends upward from edges of the horizontal portion 4A. The lower vertical portion 4C (the second body section) extends downward from a vehicular interior edge of the horizontal portion 4A. The upper vertical portion 4B includes a rear section that is coupled to the rear trim 5.

As illustrated in FIGS. 6 and 7, the upper vertical portion 4B includes an upper right support portion 41 (a second upper support portion), a sloped surface 43, and a recess 44. The upper right support portion 41 is in an upper section of the upper vertical portion 4B and includes a support wall 41A and an upper right opposite surface 42 (a second upper opposite surface). The upper right support portion 41 is a cavity defined by the support wall 41A and the upper right opposite surface 42. The upper right opposite surface 42 faces the vehicular interior side in the vehicular width direction. The cavity has an opening in a surface of the upper vertical portion 4B facing the left trim 3. The sloped surface 43 and the recess 44 are located in a rear section of the upper vertical portion 4B. The recess 44 is located more to the rear of the upper vertical portion 4B in comparison to the sloped surface 43. The recess 44 has an opening in the surface of the upper vertical portion 4B facing the left trim 3. The sloped surface 43 is sloped downward from a front edge of the recess 44.

The lower vertical portion 4C includes a projecting portion 40 (a second projecting portion) in a front section thereof and includes a lower right support portion 46 (a second lower support portion) in a rear section thereof. The projecting portion 40 projects from a vehicular interior surface of the lower vertical portion 4C toward the vehicular interior side with respect to the vehicular width direction and extends in the front-rear direction. The projecting portion 40 is under the upper right support portion 41. The projecting portion 40 receives a right edge portion of the cargo floor board 7 and supports the cargo floor board 7 from below. The lower vertical portion 4C includes a handle recess 49 between the projecting portion 40 and the lower right support portion 46. The handle recess 49 extends in the front-rear direction and is recessed toward the vehicular exterior side.

The lower right support portion 46 is on the vehicular rear side relative to the projecting portion 40 and is at a lower level than the upper right support portion 41. The lower right support portion 46 is a cavity that is defined by a support wall 46A and a lower right opposite surface 47 (a second lower opposite surface). The lower right opposite surface 47 faces the vehicular interior side in the vehicular width direction.

As illustrated in FIGS. 1 and 7, each of the upper right support portion 41 and the lower right support portion 46 is a recess having a square opening seen from the left side and receives the right end 60R of the cassette 60 of the cargo cover assembly 6. Each of the upper right support portion 41 and the lower right support portion 46 receives the right end 60R (a second end) that is an opposite end of the left end 60L and supports the cassette 60 from the vehicular exterior side in the vehicular width direction.

When the cargo cover assembly 6 is in use and the right end 60R of the cassette 60 is fitted in the upper right support portion 41, an end surface 60R1 of the right end 60R is opposite the upper right opposite surface 42 (the second upper opposite surface). The upper right support portion 41 supports the cassette 60 above the first board portion 71 of the cargo floor board 7, which is placed on the projecting portion 40, and supports the cassette 60 from the vehicular exterior side. As illustrated in FIGS. 1, 6, and 7, the upper vertical portion 4B includes the recess 44 and the sloped surface 43 on the vehicular rear side relative to the upper right support portion 41. The recess 44 is recessed toward the vehicular exterior side and the right protrusion 62R of the flap 62 of the cargo cover assembly 6 is fitted in the recess 44. The sloped surface 43 is on the vehicular front side relative to the recess 44 and sloped downward from the front edge of the recess 44.

As illustrated in FIGS. 6 and 7, the horizontal portion 4A includes a detachable panel 9 and a second storage 90 in a rear section thereof. Tools such as a jack are stored in the second storage 90. The panel 9 is disposed under the recess 44. The second storage 90 is under the panel 9 and covered with the panel 9. An operator puts his or her finger into the handle recess 49 to lift up the panel 9 and thus the panel 9 can be detached from the horizontal portion 4A.

When the cargo cover assembly 6 is not in use (a second state) and the right end 60R of the cassette 60 is fitted in the lower right support portion 46 (the second lower support portion), the end surface 60R1 of the right end 60R is opposite the lower right opposite surface 47 (a second lower opposite surface). The lower right support portion 46 supports the cassette 60 under the second board portion 72 of the cargo floor board 7, which is placed on the projecting portion 40, and supports the cassette 60 from the vehicular exterior side with respect to the vehicular width direction. As illustrated in FIG. 7, a rear lower edge 9A of the panel 9 is configured as a portion (an upper edge) of the lower right support portion 46. As illustrated in FIG. 1, in the right trim 4, the lower right opposite surface 47 of the lower right support portion 46 is located more to the vehicular interior side (the left side) compared to the upper right opposite surface 42 of the upper right support portion 41.

Figure 9:
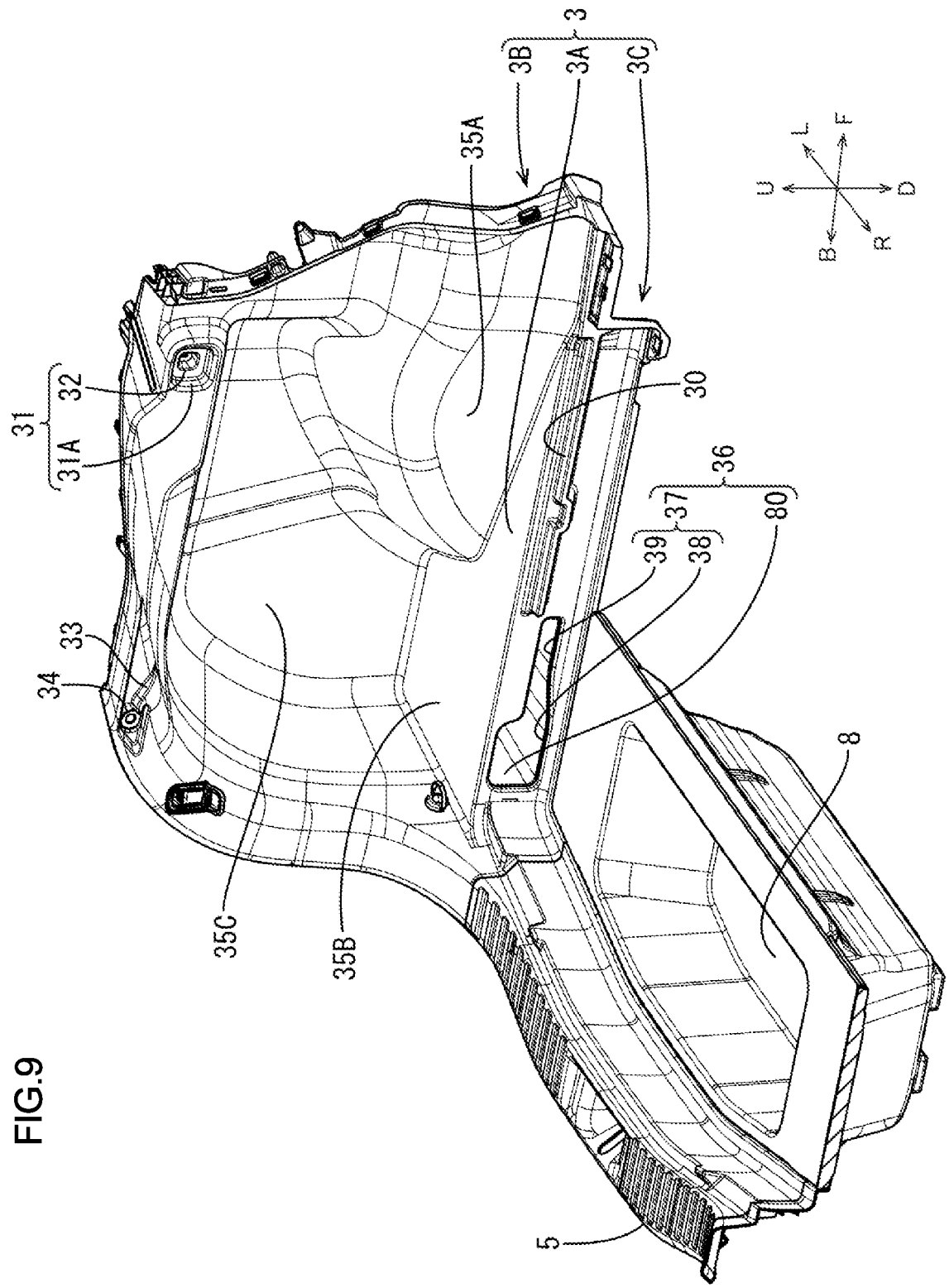
FIG. 9 is a perspective of the left trim viewed from an upper front point.

As illustrated in FIG. 9, the left trim 3 includes a horizontal portion 3A, an upper vertical portion 3B, and a lower vertical portion 3C (a first body section). The horizontal portion 3A is disposed in a horizontal position and coupled to the rear trim 5. The upper vertical portion 3B extends upward from an edge of the horizontal portion 3A. The lower vertical portion 3C extends downward from a vehicular interior edge of the horizontal portion 3A. The upper vertical portion 3B includes a rear section that is coupled to the rear trim 5.

Figure 8:
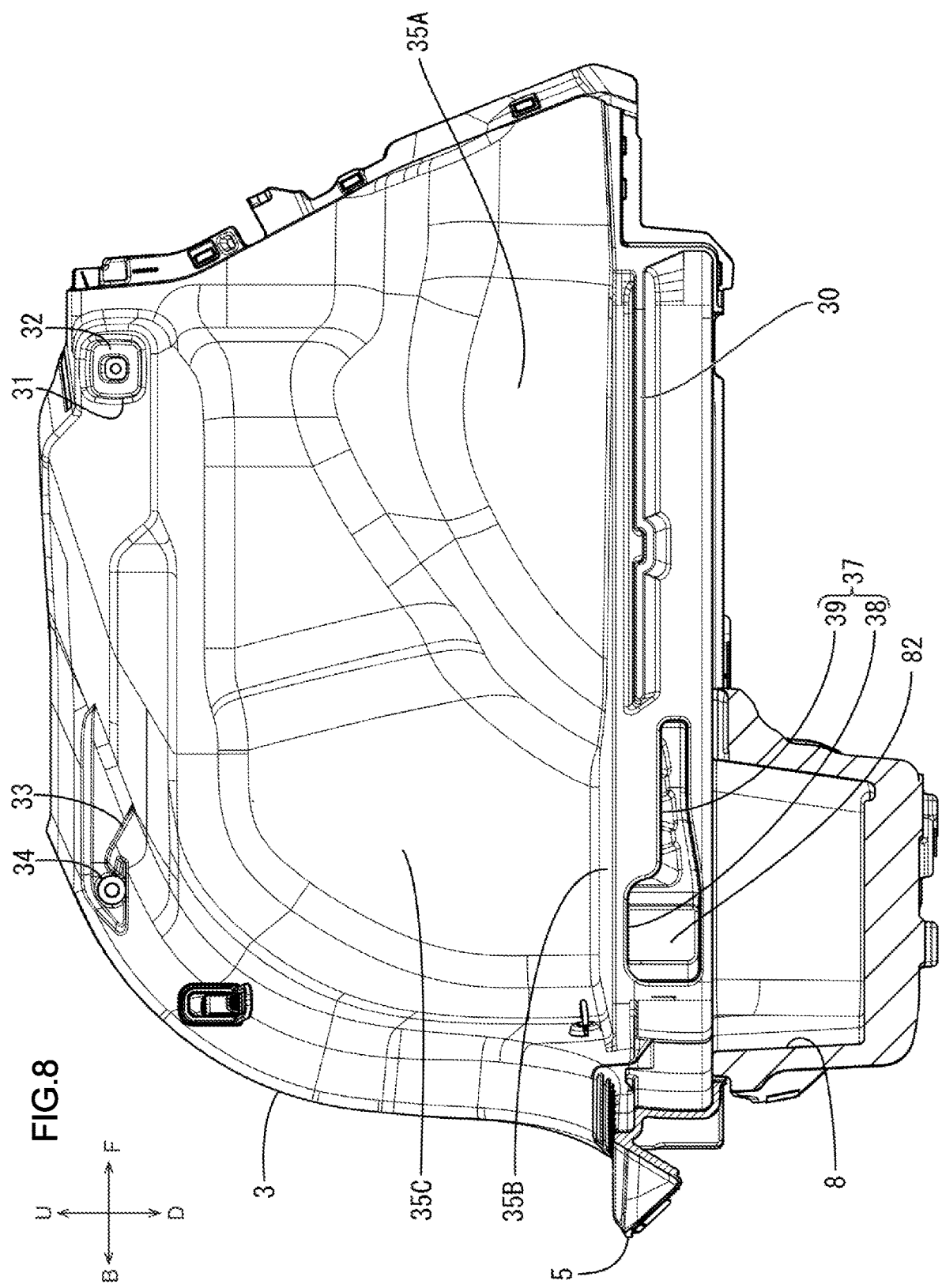
FIG. 8 is a left side view of a right trim.

As illustrated in FIGS. 8 and 9, the upper vertical portion 3B (the first body section) includes an upper left support portion 31 (a first upper support portion), a sloped surface 33, and a recess 34. The upper left support portion 31 is in an upper section of the upper vertical portion 3B and includes a support wall 31A and an upper left opposite surface 32 (a first upper opposite surface). The upper left support portion 31 is a cavity defined by the support wall 31A and the upper left opposite surface 32. The upper left opposite surface 32 faces the vehicular interior side in the vehicular width direction. The cavity has an opening in a surface of the upper vertical portion 3B facing the right trim 4. The sloped surface 33 and the recess 34 are located in a rear section of the upper vertical portion 3B. The recess 34 is located more to the rear of the upper vertical portion 3B in comparison to the sloped surface 33. The recess 34 has an opening in the surface of the upper vertical portion 3B facing the right trim 4. The sloped surface 33 is sloped downward from a front edge of the recess 34.

The lower vertical portion 3C includes a projecting portion 30 (a first projecting portion) in a front section thereof and includes a recess portion 36 (a first lower support portion) in a rear section thereof. The recess portion 36 is on the vehicular rear side relative to the projecting portion 30 and on a rear lower side relative to the upper left support portion 31. The recess portion 36 is recessed toward the vehicular exterior side in the vehicular width direction. The projecting portion 30 projects from a vehicular interior surface of the lower vertical portion 3C toward the vehicular interior side and extends in the front-rear direction. The projecting portion 30 is under the upper left support portion 31. The projecting portion 30 receives a left edge portion of the cargo floor board 7 and supports the cargo floor board 7 from below.

As illustrated in FIG. 9, the upper vertical portion 3B includes a protruding section 35A that protrudes toward the vehicular interior side to follow the shape of a wheel house. The horizontal portion 3A includes an upper wall 35B that is located on the vehicular rear side relative to the protruding section 35A. The upper wall 35B is configured as an upper wall of the recess portion 36. The upper wall 35B extends from a vehicular interior side surface 35C of the upper vertical portion 3B toward the vehicular interior side in the vehicular width direction. The vehicular interior side surface 35C extends in the vertical direction and the front-rear direction. As illustrated in FIG. 2, when the cargo floor board 7 is spread and unfolded, the upper surface of the upper wall 35B is flush with the upper surface of the second board portion 72.

The upper left support portion 31 is above the projecting portion 30. The upper left support portion 31 is a cavity that is defined by a support wall 31A and the upper left opposite surface 32 and recessed toward the vehicular exterior side in the vehicular width direction. As illustrated in FIGS. 8 and 9, the upper left support portion 31 is a recess having a square opening seen from the right side and receives the left end 60L (a first end) of the cassette 60 of the cargo cover assembly 6. The upper left support portion 31 receives the left end 60L and supports the cassette 60 from the vehicular exterior side in the vehicular width direction.

When the cargo cover assembly 6 is in use (the first state) and the left end 60L of the cassette 60 is fitted in the upper left support portion 31, the end surface 60L1 of the left end 60L is opposite the upper left opposite surface 32 (the first upper opposite surface). The upper left support portion 31 supports the cassette 60 above the first board portion 71 of the cargo floor board 7, which is placed on the projecting portion 30, and supports the cassette 60 from the vehicular exterior side in the vehicular width direction. As illustrated in FIGS. 1, 8, and 9, the upper vertical portion 3B includes the recess 34 and the sloped surface 33 on the vehicular rear side relative to the upper left support portion 31. The recess 34 is recessed toward the vehicular exterior side and the left protrusion 62L of the flap 62 of the cargo cover assembly 6 is fitted in the recess 34. The sloped surface 33 is on the vehicular front side relative to the recess 34 and sloped downward from the front edge of the recess 34.

Figure 10:
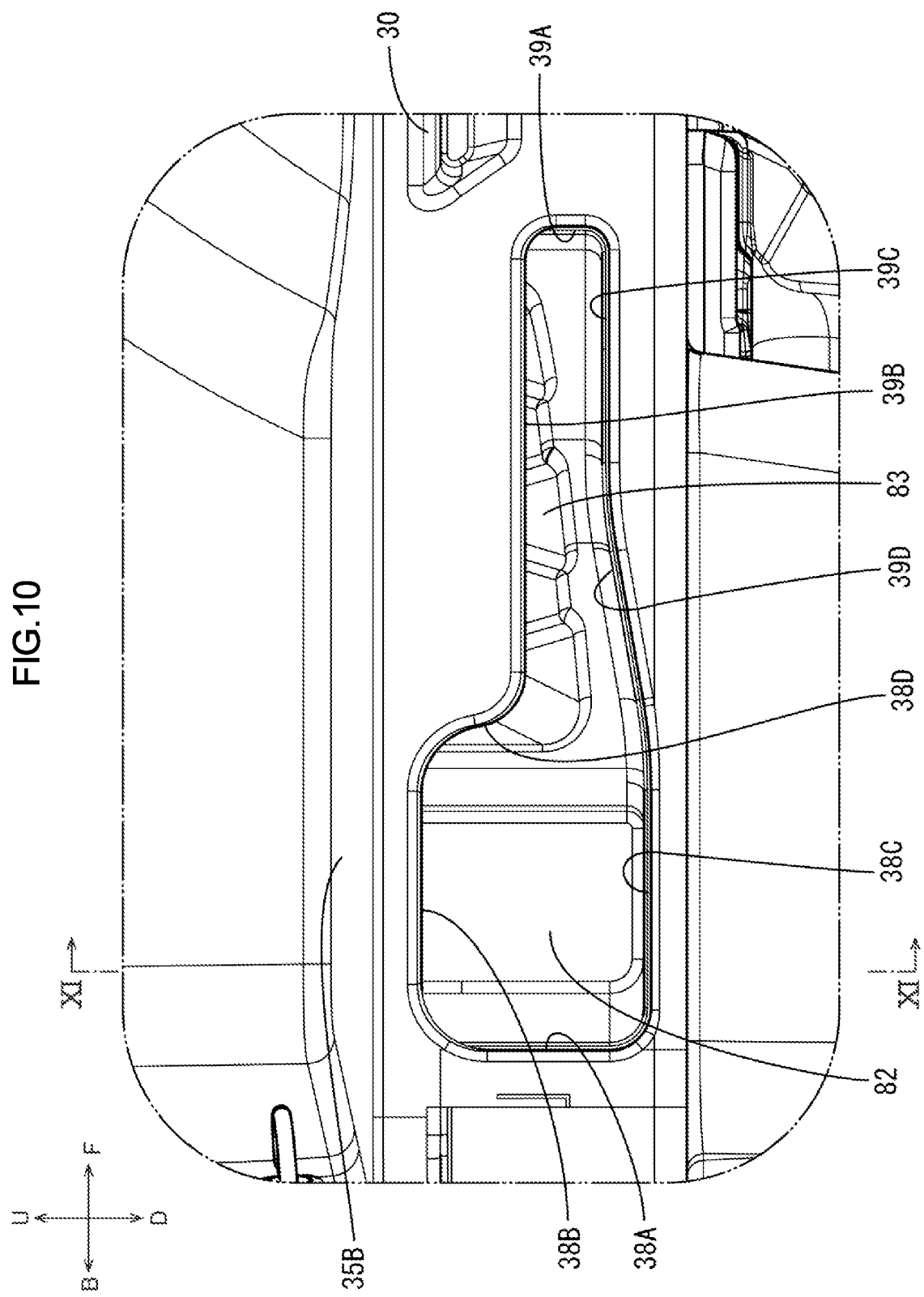
FIG. 10 is a magnified right side view of a portion of the left trim including a recess portion.

As illustrated in FIGS. 8 and 9, the recess portion 36 opens in the vehicular width direction through an opening 37 (an insertion opening) and is defined by a bracket 80 (see FIGS. 11 and 12) and the upper wall 35B that is a section of the horizontal portion 3A. The bracket 80 has a recessed shape and is attached to the horizontal portion 3A of the left trim 3 from the vehicular exterior side (the left side). As illustrated in FIG. 10, the opening 37 extends in the front-rear direction and includes a rear opening section 38 (a first opening section) and a front opening section 39 (a second opening section).

The rear opening section 38 is a square opening seen from the right side. The rear opening section 38 has a first height measuring in a vertical direction and a first length measuring in the vehicular front-rear direction, and the first height is smaller than the first length. The rear opening section 38 includes a rear opening edge having about a C shape. With such a configuration, the left end 60L of the cassette 60 is just fitted to the rear opening section 38 and can be inserted through the rear opening section 38 smoothly and easily.

The front opening section 39 is an elongated rectangular opening extending in the front-rear direction. The front opening section 39 has a second height measuring in the vertical direction and a second length measuring in the vehicular front-rear direction, and the second height is smaller than the second length. The front opening section 39 includes a front opening edge having about a U shape. With such a configuration, a left section of the flap 62 is just fitted to the front opening section 39 and can be inserted through the front opening section 39 smoothly and easily.

The front opening section 39 is continuous from the rear opening section 38 and two ends of the front opening edge of the front opening section 39 are continuous to two ends of the rear opening edge of the rear opening section 38, respectively. The second height of the front opening section 39 is smaller than the first height of the rear opening section 38 and the first length of the rear opening section 38 is smaller than the second length of the front opening section 39. A portion of the cargo cover assembly 6 can be inserted in the recess portion 36 through the opening 37 from the vehicular interior side.

Figure 11:
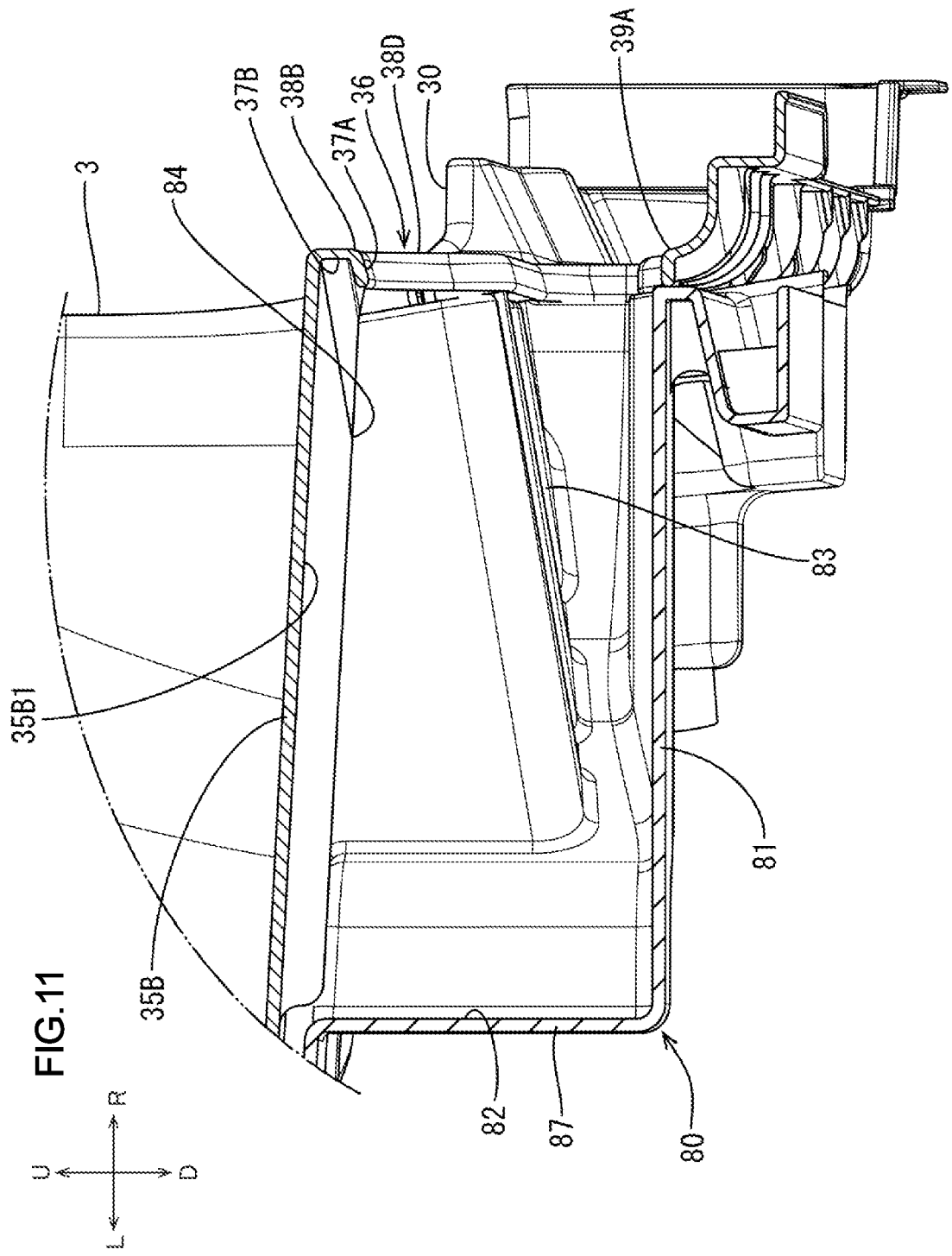
FIG. 11 is a magnified cross-sectional view of the portion of the left trim along line XI-XI in FIG. 10.
Figure 12:
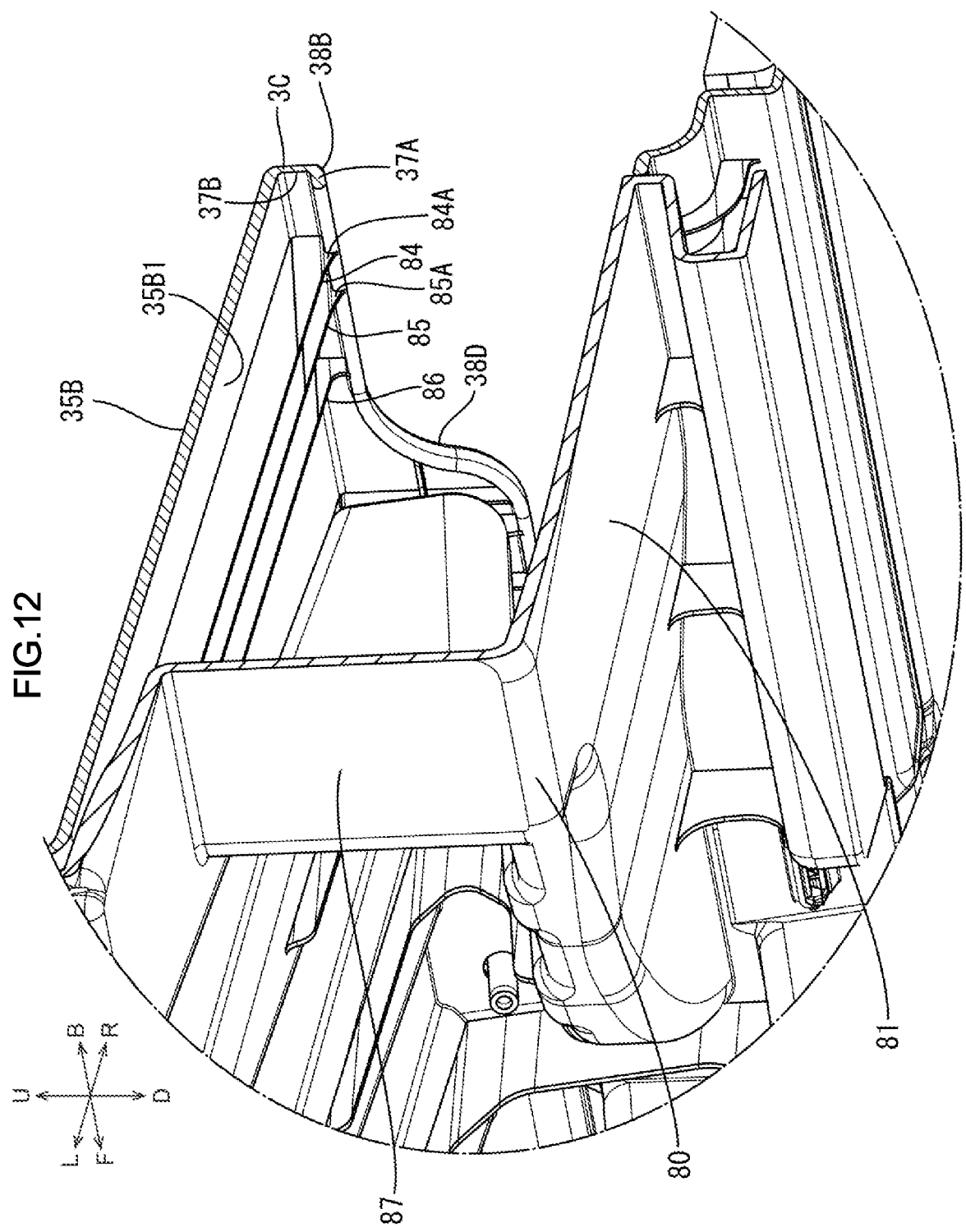
FIG. 12 is a perspective view of the portion of the left trim viewed from a lower left point.

The left end 60L of the cassette 60 of the cargo cover assembly 6 is inserted in the recess portion 36 through the rear opening section 38. The rear opening section 38 is greater in the vertical direction and smaller in the front-rear direction than the front opening section 39. As illustrated in 10, the rear opening edge includes a rear vertical edge 38A, an upper rear horizontal edge 38B, a lower rear horizontal edge 38C, and a middle vertical edge 38D (a connection edge). The upper rear horizontal edge 38B and the lower rear horizontal edge 38C extend frontward from two ends of the rear vertical edge 38A. The middle vertical edge 38D extends downward from an end of the upper rear horizontal edge 38B. As illustrated in FIGS. 11 and 12, the upper rear horizontal edge 38B and the middle vertical edge 38D have a bent portion 37A. The bent portion 37A is bent inwardly toward the inside of the recess portion 36. As illustrated in FIGS. 11 and 12, a recess 37B is defined by a vehicular interior section of the upper wall 35B (a section of the horizontal portion 3A), an upper section of the lower vertical portion 3C between the upper wall 35B and the upper rear horizontal edge 38B, and the bent portion 37A.

The front opening edge of the front opening section 39 includes a front vertical edge 39A, an upper front horizontal edge 39B, a lower front horizontal edge 39C, and a sloped edge 39D. The upper front horizontal edge 39B extends straight from the middle vertical edge 38D of the rear opening section 38 to an upper end of the front vertical edge 39A. The upper front horizontal edge 39B has the bent portion 37A. The lower front horizontal edge 39C extends rearward from a lower end of the front vertical edge 39A and is continuous to the sloped edge 39D. The sloped edge 39D is sloped downward as it extends rearward. The sloped edge 39D is continuous to the lower rear horizontal edge 38C of the rear opening section 38. The left end portion of the flap 62 of the cargo cover assembly 6 is inserted in the recess portion 36 through the front opening section 39.

As illustrated in FIGS. 10 and 11, the bracket 80 includes a lower wall 81 and a bottom wall 87 that has a bottom surface 82 (a first lower opposite surface). The lower wall 81 is configured as a lower wall of the recess portion 36. The lower wall 81 extends in the vehicular width direction and the front-rear direction. The bottom wall 87 extends upward from a vehicular exterior edge (left edge) of a vehicular rear section of the lower wall 81. The bottom surface 82 of the bottom wall 87 is opposite the rear opening section 38 and on the vehicular exterior side with respect to the rear opening section 38. The bottom surface 82 faces the vehicular interior side in the vehicular width direction.

The recess portion 36 includes a sloped wall 83 as an upper wall of the recess portion 36. The sloped wall 83 is on the vehicular exterior side (left side) with respect to the front opening section 39 in the vehicular width direction. The sloped wall 83 is sloped downward as it extends toward the vehicular exterior side (the left side) in the vehicular width direction. With such a configuration, a space between the sloped wall 83 and the lower wall 81 decreases as it extends closer to the vehicular exterior side in the vehicular width direction or closer to the bottom surface 82. With such a configuration, the left end section of the flap 62 is moved along the sloped wall 83 and inserted into the space of the recess portion 36 between the lower wall 81 and the sloped wall 83 smoothly. The bottom wall 87 has a square shape seen from the right side. The sloped wall 83 includes long protrusions and long recesses that are arranged alternately in the front-rear direction. The long protrusions and long recesses extend in the vehicular width direction.

As illustrated in FIG. 12, the recess portion 36 includes a first rib 84, a second rib 85, and a third rib 86. The first rib 84, the second rib 85, and the third rib 86 project downward from a lower surface 35B1 of the upper wall 35B and extend in the vehicular width direction from a section of the lower vertical portion 3C near the rear opening section 38. The first rib 84, the second rib 85, and the third rib 86 extend from the bottom surface 82 to a recessed inner surface of the recess 37B of the lower vertical portion 3C. The first rib 84, the second rib 85, and the third rib 86 extend from the bottom surface 82 to a vehicular exterior side surface of the lower vertical portion 3C. The first rib 84 and the second rib 85 have a projecting dimension extending from the lower surface 35B1 to the upper rear horizontal edge 38B. The first rib 84 is closest to the rear side among the ribs 84, 85, 86. The second rib 85 is in front of the first rib 84 and the third rib 86 is in front of the second rib 85 in the vehicular front-rear direction.

As illustrated in FIGS. 11 and 12, vehicular interior end sections of the first rib 84 and the second rib 85 project from the lower surface 35B1 of the upper wall 35B to a distal end of the bent portion 37A. The first rib 84 and the second rib 85 include a first projection 84A and a second projection 85A, respectively, that project downward from the vehicular interior end sections of the first rib 84 and the second rib 85. The first projection 84A and the second projection 85A are in contact with the distal end of the bent portion 37A. The lower edges of the vehicular interior sections of the first rib 84 and the second rib 85 are on the same level as the upper rear horizontal edge 38B and are smoothly continuous to the upper rear horizontal edge 38B. With such a configuration, the left end 60L of the cassette 60 is smoothly taken out of the recess portion 36. The third rib 86 has a height in the vertical direction (projecting dimension) that is smaller than that of the first rib 84 and the second rib 85.

When the cargo cover assembly 6 is not in use, the left end 60L of the cassette 60 is inserted in a space (a first lower space) of the recess portion 36 between the lower wall 81 and the upper wall 35B through the rear opening section 38 and the left end section of the flap 62 is inserted in the space of the recess portion 36 between the lower wall 81 and the sloped wall 83 through the front opening section 39. The left end 60L of the cassette 60 and the left end section of the flap 62 of the cargo cover assembly 6, which is not in use, are disposed in the recess portion 36 such that the cargo cover assembly 6 is supported from the vehicular exterior side in the width direction and is stored under the cargo floor board 7. As illustrated in FIGS. 4 and 5, when the left end 60L of the cassette 60 of the cargo cover assembly 6, which is not in use, is inserted in the recess portion 36, the end surface 60L1 of the left end 60L is opposite the bottom surface 82. As illustrated in FIG. 1, in the left trim 3, the bottom surface 82 is on the vehicular exterior side in the vehicular width direction relative to the upper left opposite surface 32 of the upper left support portion 31.

In FIGS. 1 and 4, a center line C of the cargo space 2 in the vehicular width direction (the right-left direction) is indicated by a dashed line. The center line C includes a center position between the left trim 3 and the right trim 4 or a center position between the projecting portion 30 and the projecting portion 40 in the vehicular width direction. The center line C also includes a center position of the cargo floor board 7, which is placed on the projecting portions 30, 40, in the vehicular width direction. As illustrated in FIG. 1, the upper left opposite surface 32 and the upper right opposite surface 42 are away from each other with a distance L1 and a center P1 of the distance L1 is defined. The bottom surface 82 and the lower right opposite surface 47 are away from each other with a distance L2 and a center P2 of the distance L2 is defined.

The upper left opposite surface 32 and the upper right opposite surface 42 are defined such that the center P1 of the distance L1 is located on the center line C. The center of the cargo cover assembly 6, which is in use, in the vehicular width direction is located at the center of the cargo space 2 in the vehicular width direction. The bottom surface 82 and the lower right opposite surface 47 are defined such that the center P2 of the distance L2 is located closer to the bottom surface 82 with respect to the center line C. The center P2 is located on the left side or the vehicular exterior side in the vehicular width direction with respect to the center line C. The center of the cargo cover assembly 6, which is not in use and stored, in the vehicular width direction is located closer to the bottom surface 82 (the left side) with respect to the center of the cargo space 2 in the vehicular width direction. The distance L2 between the bottom surface 82 and the lower right opposite surface 47 is greater than the distance L1.

When the cargo cover assembly 6, which is in use, is stored in a space under the cargo floor board 7, following steps are performed. As illustrated in FIGS. 1 to 3, the cargo cover 61 of the cargo cover assembly 6, which is in a spread state and covers the cargo space 2, is rolled up and the cargo floor board 7 is folded (see FIG. 4). The cassette 60 of the cargo cover assembly 6 is pushed and shrunk with the spring mechanism and detached from the upper left support portion 31 and the upper right support portion 41. The cargo cover assembly 6 is turned upside down such that the back surface 62B of the flap 62 faces upward.

Figure 13:
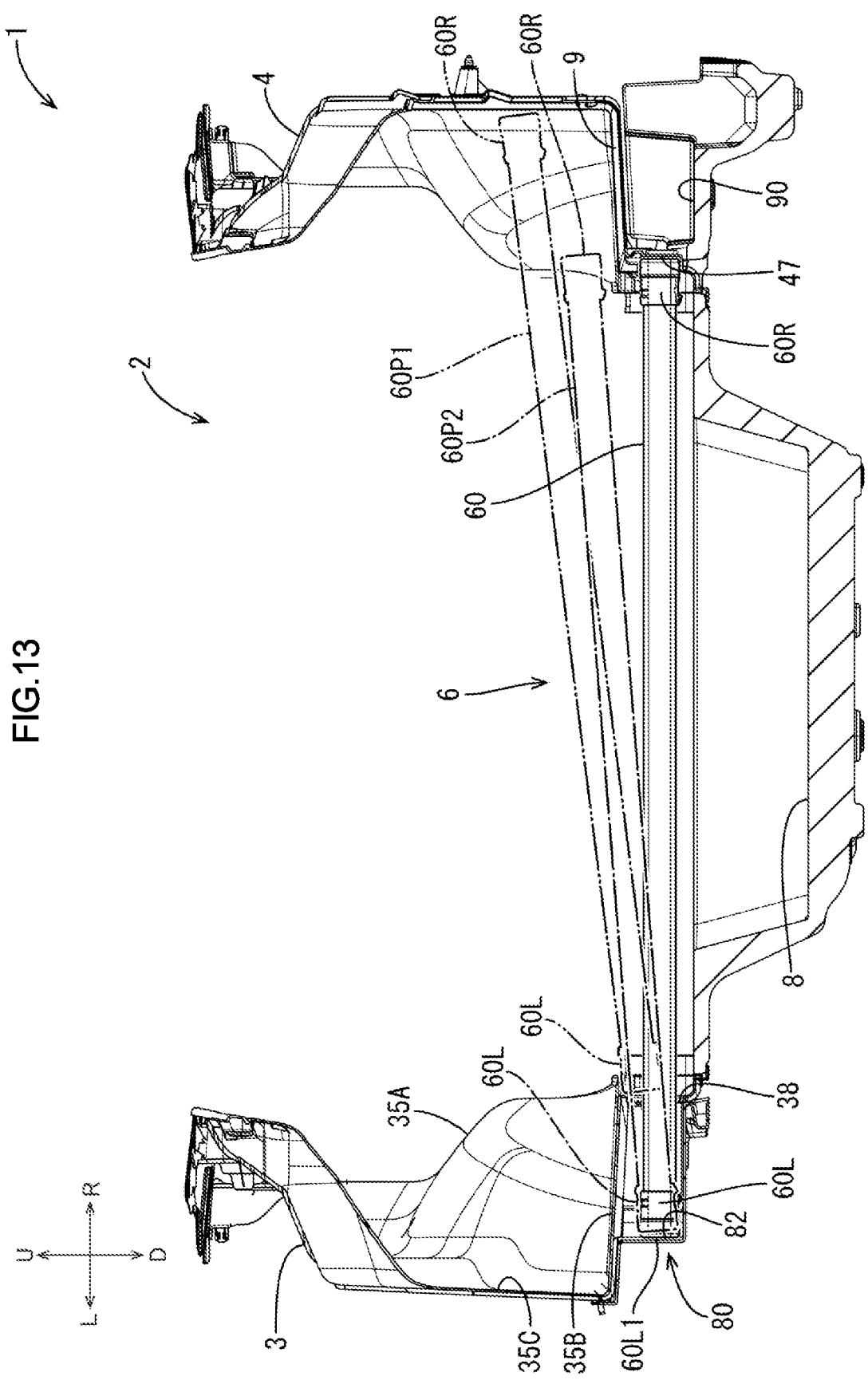
FIG. 13 is an explanatory view illustrating storing of a cargo cover assembly including a cassette at different positions.

The cargo cover assembly 6 is stored in a space under the cargo floor board 7 via a first position 60P1 and a second position 60P2 as illustrated in FIG. 13. First, the cassette 60 is placed at the first position 60P1 such that the left end 60L is placed on the vehicular interior side relative to the rear opening section 38 and the right end 60R is placed above the panel 9. At the first position 60P1, the cassette 60 is tilted with respect to the horizontal direction and is inserted through the opening 37 of the recess portion 36 with being tilted. The left end 60L is inserted into the recess portion 36 through the rear opening section 38 and the left end section of the flap 62 is inserted into the recess portion 36 through the front opening section 39 while the cassette 60 being tilted with respect to the horizontal direction. The rear opening section 38 has an opening height that allows the left end 60L to be inserted smoothly through the rear opening section 38 while the cassette 60 being tilted.

Next, the cassette 60 is further inserted into the recess portion 36 until the left end 60L reaches and contacts the bottom surface 82. The right end 60R is above the lower right support portion 46. Thus, the cassette 60 is placed at the second position 60P2. Then, the cassette 60, which is disposed at the second position 60P2, is pushed into the recess portion 36 while the left end 60L contacting the bottom surface 82 and thus the cassette 60 shrinks in the longitudinal direction of the cassette 60 with the spring mechanism such that the right end 60R is fitted in the lower right support portion 46. Thus, the left end 60L and the left end section of the flap 62 are disposed in the recess portion 36 and the right end 60R is in the lower right support portion 46. As a result, the cargo cover assembly 6 is stored in the space under the cargo floor board 7. The cargo cover assembly 6, which is stored in the space under the cargo floor board 7 as described in FIG. 4, can be taken out of the space under the cargo floor board 7 by pushing the cassette 60 into the recess portion 36 and lifting up the right end 60R from the lower right support portion 46 and pulling the left end 60L and the left end section of the flap 62 out of the recess portion 36.

The vehicle cargo compartment structure 1 according to this embodiment includes the left trim 3 and the right trim 4 that are opposite each other in the vehicular width direction, the cargo floor board 7, and the cargo cover assembly 6. The cargo cover assembly 6 that is in use is disposed above the cargo floor board 7 and the cargo cover assembly 6 that is not in use is disposed under the cargo floor board 7. The left trim 3 includes the upper left support portion 31 that supports the left end 60L of the cargo cover assembly 6 that is in use and the recess portion 36 that supports the left end 60L of the cargo cover assembly 6 that is not in use. The upper left support portion 31 includes the upper left opposite surface 32 that is opposite the left end 60L of the cargo cover assembly 6 that is in use. The recess portion 36 includes the bottom surface 82 that is opposite the left end 60L of the cargo cover assembly 6 that is not in use. The upper left support portion 31 includes the upper left opposing surface 32 that is opposite the left end 60L of the cargo cover assembly 6 that is in use. The recess portion 36 includes the bottom surface 82 that is opposite the left end 60L of the cargo cover assembly 6 that is not in use. The bottom surface 82 is more to the vehicular exterior side in the vehicular width direction compared to the upper left opposite surface 32.

According to such a vehicle cargo compartment structure 1, to store the cargo cover assembly 6 in the space under the cargo floor board 7, the cargo cover assembly 6 including the cargo cover 61 stored in the cassette 60 is inserted in the recess portion 36 while being tilted with respect to the horizontal direction. The cargo cover assembly 6 is tilted such that the right end 60R is located higher than the left end 60L to insert the left end 60L into the recess portion 36 first. This embodiment does not need to include a member, which can be open and closed, to cover the storing section in which the cargo cover assembly 6 is stored. According to the configuration of this embodiment, the right end 60R can be fitted in the lower right support portion 46 smoothly with the left end 60L being inserted in the recess portion. Thus, the cargo cover assembly 6 can be stored in and taken out of a storage space easily.

The right trim 4 includes the upper right opposite surface 42 and the lower right opposite surface 47. The upper right opposite surface 42 is opposite the right end 60R, which is an opposite end from the left end 60L, when the cargo cover assembly 6 is in use. The lower right opposite surface 47 is opposite the right end 60R when the cargo cover assembly 6 is not in use. The lower right opposite surface 47 is located on the vehicular interior side in the vehicular width direction with respect to the upper right opposite surface 42.

According to such a vehicle cargo compartment structure 1, the right trim 4 has a space extending between the upper right opposite surface 42 and the lower right opposite surface 47 in the vehicular width direction and the second storage 90 in which any members such as a jack are stored can be provided in the space. The cargo cover assembly 6 can be stored in and taken out of the space under the cargo floor board 7 smoothly and easily with using the space extending between the upper right opposite surface 42 and the lower right opposite surface 47 in the vehicular width direction.

The distance L2 between the bottom surface 82 and the lower right opposite surface 47 is greater than the distance L1 between the upper left opposite surface 32 and the upper right opposite surface 42. According to such a configuration, the cargo cover assembly 6 can be stored in and taken out of the space under the cargo floor cover 7 smoothly and easily. Such a configuration is more effective for the cargo cover assembly 6 that is elastically shrinkable in the vehicular width direction.

The recess portion 36 includes the opening 37 through which the left end 60L of the cargo cover assembly 6 is inserted in the recess portion 36. The upper section of the rear opening section 38 of the opening 37 includes the bent portion 37A that is bent toward the inside of the recess portion 36. According to such a configuration, a user feels smooth touch when the user touches the bent portion 37A with the user's finger.

The recess portion 36 includes the rear opening section 38 through which the left end 60L of the cargo cover assembly 6 is inserted in the recess portion 36. The recess portion 36 includes the first rib 84, the second rib 85, and the third rib 86 that project downward from the upper wall 35B and project toward the rear opening section 38.

According to such a configuration, when the cargo cover assembly 6 is pulled out of the recess portion 36 through the opening 37, the cassette 60 can be guided by the first rib 84, the second rib 85, and the third rib 86 toward the rear opening section 38. Therefore, the left end 60L of the cargo cover assembly 6 is less likely to hit the opening edge of the rear opening section 38 when the cargo cover assembly 6 is pulled out of the recess portion 36. Furthermore, the left end 60L of the cargo cover assembly 6 is less likely to rattle within the recess portion 36.

The recess portion 36 includes the bracket 80 that is attached to a section of the left trim 3 near the rear opening section 38. The left end 60L of the cargo cover assembly 6 is inserted into the recess portion 36 through the rear opening section 38. The bracket 80 has a recessed shape and includes the bottom surface 82.

According to such a configuration, the section of the left trim 3 near the rear opening section 38 has high rigidity. When the cargo cover assembly 6 is stored in the space under the cargo floor board 7, the left end 60L of the cargo cover assembly 6 is inserted through the rear opening section 38 and received by the bracket 80. The cargo cover assembly 6 is less likely to be damaged near the rear opening section 38 and stably stored in the bracket 80.

As illustrated in FIGS. 1 and 4, the recess portion 36 includes a bottom section 36A that is smaller in a vertical dimension measuring in the upper-lower direction and in a length dimension measuring in the vehicular front-rear direction than those of the other section of the recess portion 36. The bottom section 36A includes the bottom wall 87 and side walls that extend from edges of the bottom wall 87, respectively. The bottom surface 82 has a same size as that of the left end surface 60L1 of the left end 60L and the side walls of the bottom section 36A has an inner peripheral size same as an outer peripheral size of the left end 60L. With such a configuration, the left end 60L can be held by the bottom section 36A of the recess portion 36 and the cargo cover assembly 6 is less likely to rattle within the recess portion 36.

Other Embodiments

The present disclosure is not limited to the embodiment described above and illustrated in the drawings. The following embodiments may be included in the technical scope of the technology described herein. The technology described herein may be modified within the technical scope.

(1) The cargo cover assembly may not have the above configuration and may be a plate member including two round corners at the rear end section. The cassette 60 may not be configured to shrink and expand in the vehicular width direction.

(2) The configurations of the right trim and the left trim may be switched to each other. For example, the right trim may include a first upper opposite surface and a first lower opposite surface and the left trim may include a second upper opposite surface and a second lower opposite surface.

(3) In the right trim, the lower right opposite surface 47 may be located just below the upper right opposite surface 42.

(4) The shapes of the support portions are not limited to those described in the above embodiment. The shape of each support portion may be any shape as long as the cargo cover assembly does not drop therefrom when the end portion of the cargo cover assembly is fitted to the support portion.

The invention claimed is:
1. A vehicle cargo compartment structure comprising:
a first side trim including
   a first body section, and
   a first projecting portion projecting from the first body section toward a vehicular interior side in a vehicular width direction; and
a second side trim disposed opposite the first side trim in the vehicular width direction and having a cargo space between the first side trim and the second side trim, the second side trim including
   a second body section, and
   a second projecting portion projecting from the second body section toward the vehicular interior side in the vehicular width direction, and the second projecting portion and the first projecting portion receiving a cargo floor board thereon,
wherein the first side trim further includes
   a first upper support portion above the first projecting portion, the first upper support portion supporting a first end of a cargo cover assembly in a first state and including a first upper opposite surface that is opposite the first end in the first state, and
a first lower support portion under the first projecting portion, the first lower support portion supporting the first end in a second state and including a first lower opposite surface that is opposite the first end in the second state, and
the first lower opposite surface is more to a vehicular exterior side in the vehicular width direction compared to the first upper opposite surface.

2. The vehicle cargo compartment structure according to claim 1, wherein
the second side trim further includes
a second upper support portion above the second projecting portion, the second upper support portion supporting a second end of the cargo cover assembly that is an opposite end from the first end in the first state and including a second upper opposite surface that is opposite the second end in the first state, and
a second lower support portion under the second projecting portion, the second lower support portion supporting the second end in the second state and including a second lower opposite surface that is opposite the second end in the second state, and
the second lower opposite surface is more to the vehicular interior side in the vehicular width direction compared to the second upper opposite surface.

3. The vehicle cargo compartment structure according to claim 2, wherein a distance between the first lower opposite surface and the second lower opposite surface is equal to or greater than a distance between the first upper opposite surface and the second upper opposite surface.

4. A vehicle cargo compartment structure comprising:
a first side trim including
a first body section, and
a first projecting portion projecting from the first body section toward a vehicular interior side in a vehicular width direction; and
a second side trim disposed opposite the first side trim in the vehicular width direction and having a cargo space between the first side trim and the second side trim, the second side trim including
a second body section, and
a second projecting portion projecting from the second body section toward the vehicular interior side in the vehicular width direction, and the second projecting portion and the first projecting portion receiving a cargo floor board thereon,
wherein the first side trim further includes
a first upper support portion above the first projecting portion, the first upper support portion supporting a first end of a cargo cover assembly in a first state and including a first upper opposite surface that is opposite the first end in the first state, and
a first lower support portion under the first projecting portion, the first lower support portion supporting the first end in a second state and including a first lower opposite surface that is opposite the first end in the second state,
the first lower opposite surface is more to a vehicular exterior side in the vehicular width direction compared to the first upper opposite surface,
the first lower support portion has a recessed shape having a first lower space therein and includes an insertion opening through which the first end of the cargo cover assembly is inserted in the first lower space, and the first lower support portion includes an opening edge of the insertion opening and a portion of the opening edge includes a bent portion that is bent inward toward the first lower space.

5. The vehicle cargo compartment structure according to claim 1, wherein
the first lower support portion has a recessed shape having a first lower space therein and includes an insertion opening through which the first end of the cargo cover assembly is inserted in the first lower space, and
the first lower support portion includes an upper wall and a rib that projects downward from the upper wall near the insertion opening.

6. The vehicle cargo compartment structure according to claim 1, wherein
the first lower support portion has a recessed shape having a first lower space therein and includes an insertion opening through which the first end of the cargo cover assembly is inserted in the first lower space, and
the first lower support portion includes a bracket that includes a lower wall and a bottom wall of the first lower support portion, the bottom wall includes the first lower opposite surface.

7. The vehicle cargo compartment structure according to claim 1, wherein
the first lower support portion has a recessed shape having a first lower space therein and includes an insertion opening that extends in a vehicular front-rear direction and through which the first end of the cargo cover assembly is inserted in the first lower space, and
the insertion opening includes a first opening section that is a vehicular rear section of the insertion opening and a second opening section that is a vehicular front section of the insertion opening and elongated in the vehicular front-rear direction.

8. The vehicle cargo compartment structure according to claim 7, wherein
the first end of the cargo cover assembly includes a first cassette end portion of a long cassette of the cargo cover assembly and a first flap end portion of a flap of the cargo cover assembly,
the first cassette end portion of the long cassette of the cargo cover assembly is inserted in the first lower space of the first lower support portion through the first opening section,
the first flap end portion of the flap of the cargo cover assembly is inserted in the first lower space through the second opening section, and
the first cassette end portion and the first flap end portion are arranged in the first lower space of the first lower support portion.

9. The vehicle cargo compartment structure according to claim 7, wherein
the first lower support portion includes a lower wall, an upper wall, and a bottom wall that connects the lower wall and the upper wall, and the first lower space of the first lower support portion is defined by the lower wall, the upper wall, and the bottom wall, and
the upper wall includes a sloped wall section that is sloped downward as it extends from the second opening section toward the vehicular exterior side in the vehicular width direction.

10. A vehicle cargo compartment structure comprising:
a first side trim including
a first body section,
a first projecting portion projecting from the first body section toward a vehicular interior side, and a first lower support portion that is a recess portion on a vehicular interior surface of the first body section and under the first projecting portion, the first lower support portion having an insertion opening that extends in a vehicular front-rear direction and receiving a first end of a cargo cover assembly in a first lower space of the first lower support portion through the insertion opening; and a second side trim disposed opposite the first side trim in a vehicular width direction and having a cargo space between the first side trim and the second side trim, the second side trim including a second body section a second projecting portion projecting from the second body section toward the vehicular interior side, the second projecting portion and the first projecting portion receiving a cargo floor board thereon, a second lower support portion that is on a vehicular interior surface of the second body section and under the second projecting portion, the second support portion receiving a second end of the cargo cover assembly that is an opposite end from the first end.

11. The vehicle cargo compartment structure according to claim 10, wherein the insertion opening includes a first opening section that is a vehicular rear section of the insertion opening and a second opening section that is a vehicular front section of the insertion opening and elongated in the vehicular front-rear direction.

12. The vehicle cargo compartment according to claim 11, wherein the first opening section has a first height measuring in a vertical direction and a first length measuring in the vehicular front-rear direction, the first height is smaller than the first length, the second opening section has a second height measuring in the vertical direction and a second length measuring in the vehicular front-rear direction, the second height is smaller than the second length, and the second height is smaller than the first height and the first length is smaller than the second length.

13. The vehicle cargo compartment structure according to claim 11, wherein the first opening section has a first opening edge having a C-shape with two ends and the second opening section has a second opening edge having an elongated U-shape with two ends, and the two ends of the first opening edge are connected to the two ends of the second opening edge, respectively.

14. The vehicle cargo compartment structure according to claim 11, wherein the first end of the cargo cover assembly includes a first cassette end portion of a long cassette of the cargo cover assembly and a first flap end portion of a flap of the cargo cover assembly, the first cassette end portion of the long cassette of the cargo cover assembly is inserted in the first lower space of the first lower support portion through the first opening section, the first flap end portion of the flap of the cargo cover assembly is inserted in the first lower space through the second opening section, and the first cassette end portion and the first flap end portion are arranged in the first lower space of the first lower support portion.

15. The vehicle cargo compartment structure according to claim 11, wherein the first lower support portion includes a lower wall, an upper wall, and a bottom wall that connects the lower wall and the upper wall, and the first lower space of the first lower support portion is defined by the lower wall, the upper wall, and the bottom wall, and the upper wall includes a sloped wall section that is sloped downward as it extends from the second opening section toward the vehicular exterior side in the vehicular width direction.

16. The vehicle cargo compartment structure according to claim 11, wherein the first lower support portion includes an upper wall of the recess portion and a rib that projects downward from the upper wall and extends in the vehicular width direction from an opening edge of the insertion opening.

17. The vehicle cargo compartment structure according to claim 16, wherein the rib has a projecting dimension extending from a lower surface of the upper wall to a first opening edge of the first opening section.

18. The vehicle cargo compartment structure according to claim 14, wherein the first opening section includes a first opening edge that includes a first upper opening edge, a first lower opening edge, a rear opening edge, and a connection opening edge, the first upper opening edge and the first lower opening edge extend in the vehicular front-rear direction and are opposite each other, the rear opening edge extends in an upper-lower direction and is connected to the first upper opening edge and the first lower opening edge, the connection opening edge is opposite the rear opening edge and extends downward from the first upper opening edge, the second opening section includes a second opening edge that includes a second upper opening edge, a second lower opening edge, and a front opening edge, the second upper opening edge and the second lower opening edge extend in the front-rear direction and are opposite each other, the front opening edge extends in the upper-lower direction and is connected to the second upper opening edge and the second lower opening edge, and the second lower opening edge is connected to the first lower opening edge and the second upper opening edge is connected to the connection opening edge.

* * * * *